US007484329B2

(12) United States Patent
Levy (10) Patent No.: US 7,484,329 B2
(45) Date of Patent: *Feb. 3, 2009

(54) **TECHNOLOGY FOR CULTIVATION OF *PORPHYRA* AND OTHER SEAWEEDS IN LAND-BASED SEA WATER PONDS**

(75) Inventor: Israel Levy, Miagav (IS)

(73) Assignee: Seaweed Bio-Technology Inc., New York, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/490,639

(22) Filed: Jul. 21, 2006

(65) Prior Publication Data

US 2006/0254134 A1  Nov. 16, 2006

Related U.S. Application Data

(63) Continuation-in-part of application No. 10/718,357, filed on Nov. 20, 2003, now Pat. No. 7,080,478.

(51) Int. Cl.
A01G 31/00 (2006.01)
A01G 7/00 (2006.01)
A01G 33/00 (2006.01)

(52) U.S. Cl. .................. 47/1.4; 47/59 R; 47/62 N; 435/257.1; 435/283.1

(58) Field of Classification Search .............. 47/1.4, 47/59 R, 62 N; 435/257.1, 283.1
See application file for complete search history.

(56) References Cited

U.S. PATENT DOCUMENTS

| 3,195,271 A | 7/1965 | Golueke et al. ............... 47/1.4 |
| 3,879,890 A | 4/1975 | Chen ............................ 47/1.4 |
| 3,952,325 A | 4/1976 | Beale et al. |
| 4,145,703 A | 3/1979 | Blanchard et al. |
| 4,235,043 A | 11/1980 | Harasawa .................... 47/1.4 |
| 4,725,984 A | 2/1988 | Ip et al. |
| 5,027,321 A | 6/1991 | Park |
| 5,086,325 A | 2/1992 | Schumann et al. |
| 5,089,481 A | 2/1992 | Muto et al. .................. 514/54 |

(Continued)

FOREIGN PATENT DOCUMENTS

EP      0462020 A2    12/1991

(Continued)

OTHER PUBLICATIONS

NTIS—O.S. Dept. Commerce, Techniques of Laboratory Cultivation of Marine Algae, University of South Florida, St. Petersburg Dept. of Marine Science, Nov. 1983.

(Continued)

*Primary Examiner*—Andrea M Valenti
(74) *Attorney, Agent, or Firm*—Rashida A. Karmali (57) ABSTRACT

The present invention provides unique technology, systems and methods of cultivating different types of seaweeds, including, but not limited to, *Porphyra* (Nori), *Laminaria, Undaria, Eucheuma, Gracillaria, Ulva, Sargassum, Codium, Cladophora, Ascophyllum, Palmaria, Furcellaria, Fucus* or *Enteromorpha*, in land-based seawater ponds having a climatically suitable and nutrient controlled environment. These land-based ponds may be built in any part of the world with structural engineering and architectural modifications. The land based units for cultivation of seaweeds comprise phycological laboratory facilities, U-shaped sleeves, to allow the maturation of the sporelings; growth tanks, U-shaped cultivation tanks, a plurality of small inoculation tanks aerated with air, and a harvesting unit.

10 Claims, 5 Drawing Sheets

U.S. PATENT DOCUMENTS

| | | | |
|---|---|---|---|
| 5,094,968 | A | 3/1992 | Schumann et al. |
| 5,160,736 | A | 11/1992 | Kiriyama ................. 424/195.1 |
| 5,168,334 | A | 12/1992 | Mitchell et al. |
| 5,350,588 | A | 9/1994 | Campbell .................. 426/431 |
| 5,357,134 | A | 10/1994 | Shimoji |
| 5,402,374 | A | 3/1995 | Tsuruta et al. |
| 5,590,068 | A | 12/1996 | Bergemont |
| 5,768,192 | A | 6/1998 | Eitan |
| 5,966,603 | A | 10/1999 | Eitan |
| 6,037,627 | A | 3/2000 | Kitamura et al. |
| 6,044,022 | A | 3/2000 | Nachumovsky |
| 6,056,476 | A | 5/2000 | Streichenberger ............ 405/24 |
| 6,084,794 | A | 7/2000 | Lu et al. |
| 6,136,329 | A | 10/2000 | Boratyn ..................... 424/401 |
| 6,199,317 | B1 | 3/2001 | Saike et al. .................... 47/1.4 |
| 6,201,737 | B1 | 3/2001 | Hollmer et al. |
| 6,222,762 | B1 | 4/2001 | Guterman et al. |
| 6,570,211 | B1 | 4/2001 | Guterman et al. |
| 6,281,545 | B1 | 8/2001 | Liang et al. |
| 6,429,063 | B1 | 8/2002 | Eitan |
| 6,579,714 | B1 | 6/2003 | Hirabayashi ............. 435/292.1 |
| 6,698,134 | B1 | 3/2004 | Li et al. ........................ 47/1.4 |
| 7,080,478 | B2 * | 7/2006 | Levy ............................ 47/1.4 |

FOREIGN PATENT DOCUMENTS

| | | |
|---|---|---|
| JP | 04210535 A | 7/1992 |
| JP | 06217657 A | 8/1994 |
| JP | 11113434 A | 10/1997 |
| JP | 111113529 | 4/1999 |
| JP | 2002238384 | 8/2002 |
| WO | WO94/24984 | 11/1994 |
| WO | WO99/29160 | 6/1999 |
| WO | WO99/39718 | 8/1999 |
| WO | WO00/24369 | 5/2000 |

OTHER PUBLICATIONS

Katz, Shlomit et al : "Responses of *Porphyra linearis* (Rhodophyta) to environmental factors under controlled conditions" Journal of Applied Phycology, vol. 12, No. 3-5, Oct. 2000, pp. 535-542.

Williamson, M R et al : "Nursery Engineering for Nori Aquaculture" Aquacultural Engineering, ol. 9, No. 6, 1990, pp. 429-446.

Israel, Alvaro et al: "Effect of salinity and pH on growth and aga yield of *Gracilaria tenuistipitata* var. liui in laboratory and outdoor cultivation" Journal of Applied Phycology, vol. 11, No. 6, 1999, pp. 543-549.

Alveal, K et al : "Mass cultivation of the agar-producing alga *Gracilaria chilensis* (Rhadophyta) from spores" Aquaculture, vol. 148, No. 2-3, 1997, pp. 77-83.

Lapointe, B E et al: "The Mass Outdoor Culture of Macroscopic Marine Algae" Aquaculture, vol. 8, No. 1, 1976, pp. 9-21.

Hafting, Jeff T: "A novel technique for propagation of *Porphyra yezoensis* Ueda Blades in suspension cultures via monospores" Journal of Applied Phycology, vol. 11, No. 4, 1999, pp. 361-367.

Chopin, Thierry et al: "Integrating seaweeds into marine aquaculture systems: A key toward sustainability" Journal of Phycology, vol. 37, No. 6, Dec. 2001, pp. 975-986.

Leuning, Klaus et al: "Mass cultivation of seaweeds: Current aspects and approaches." Journal of Applied Phycology, vol. 15, No. 2-3, Jan. 2003, pp. 115-119.

Friedlander, M et al: "Cultivation of *Gracilaria* in outdoor tanks and ponds" Journal of Applied Phycology, vol. 7, No. 3, 1995, pp. 315-324.

Ugarte, R et al: "Experimental Tank Cultivation of *Gracilaria-chilensis* in Central Chile" Aquaculture, vol. 101, No. 1-2, 1992, pp. 7-16.

* cited by examiner

Schematic Porphyra cultivation

FIG. 7

Summery of annual cultivation activity by growth stages in Israel

| Month | Growth Stages | | | | | |
|---|---|---|---|---|---|---|
| | Laboratory | Sleeves | 1 | 2 | 3 | 4 |
| June 25°C | Mother Sporlings | | | | | |
| July 28°C | Mother Sporlings | | | | | |
| Aug 30°C | Mother Sporlings | | | | | |
| Sep 29°C | Sporulation/Sporlings | | | | | |
| Oct 26°C | Sporulation/Sporlings | Taw | Taw | | | |
| Nov 23°C | Sporulation/Sporlings | Taw/Yez | Taw | Taw | | |
| Dec 20°C | Sporulation/Sporlings | Taw/Yez | Taw/Yez | Taw/Yez | Taw | Taw |
| Jan 19°C | Sporulation/Sporlings | Taw/Yez | Taw/Yez | Taw/Yez | Taw/Yez | Taw/Yez |
| Feb 18°C | Sporlings freez&maint | Taw | Taw/Yez | Taw/Yez | Taw/Yez | Taw/Yez |
| Mar 18°C | Sporlings freez&maint | | | Taw | Taw/Yez | Taw/Yez |
| Apr 19°C | Sporlings freez&maint | | | | Taw | Taw |
| May 21°C | Sporlings freez&maint | | | | | |

Taw- *Porphyra* sp (Taiwan)
Tez- Porphyra Yezoensis

| Activity | |
|---|---|

TECHNOLOGY FOR CULTIVATION OF *PORPHYRA* AND OTHER SEAWEEDS IN LAND-BASED SEA WATER PONDS

CROSS-REFERENCE TO OTHER APPLICATION

This application is a Continuation-in-part of U.S. patent application Ser. No. 10/718,357 filed on Nov. 20, 2003, now U.S. Pat. No. 7,080,478 all of which is incorporated herein, with references in their entirety.

FIELD OF THE INVENTION

This invention provides unique technology, systems and methods of cultivating *Porphyra* species and other types of seaweeds in land-based seawater ponds having a climatically suitable and nutrient controlled environment. These land-based ponds may be built in any part of the world with structural engineering and architectural modifications. The systems include the design and development of suitable seawater ponds that may be installed in climatically and geographically appropriate locations on land, any where in the world. The invention provides methods of designing different stages of growth, and defining the special conditions to optimize each of the different stages in controlled environments, and enabling the cultivation of seaweeds through the year. The technology includes techniques of enriching the *Porphyra* and other seaweeds with desired nutrients and ingredients for the production of high quality products that are free of marine pollutants, in addition to generating maximum yields under optimum, clean, temperature controlled and stable environmental conditions.

BACKGROUND TO THE INVENTION

Currently, the maricultured *Porphyra*, commonly known as Nori, and other types of seaweeds, are cultivated in the open sea, in a habitat that is suitable to changing climatic conditions in an uncontrolled manner and gathered manually along the coasts of Japan, Korea, Taiwan and China. The algae are grown on nets covering approximately 70,000 hectares of the sea. Approximately 300,000 workers participate in the cultivation and gathering of *Porphyra*. This labor-intensive traditional cultivation system has several drawbacks and yet it has been the only system available for commercial cultivation of Nori. Moreover, the Nori crop grown by this cultivation system is exposed to seawater pollution, to climatic fluctuations and environmental conditions that control its quality and quantity of yield.

Because of its high protein and vitamin content, Nori is considered to be a valuable nutritional product and its consumption has been increasing progressively in recent years. For example, the market for Nori is large with total sales of seaweed products exceeding six billion dollars, and the market for Nori sheets in the US alone is estimated to be worth fifty million dollars annually. Once manually gathered, the Nori is dried into sheets and world-wide production of *Porphyra* totals about fourteen billion Nori sheets. Yet, currently, large-scale seaweed mariculture is carried out Mainly in Asia because the demand for seaweed products was traditionally high in Asia. Eleven countries produce seaweed products, for example, Japan, Korea, China, Phillipines, Indonesia, Chile, Taiwan, Vietnam, Russia, United States and Italy. Of these countries, only Japan, Korea and China produce *Porphyra*, and therefore, these countries are the exclusive suppliers for the US and European markets.

Other types of seaweeds produced in the ten countries listed above include *Laminaria, Undaria, Eucheuma*, and *Gracilaria*. The US and European markets are supplied with unsophisticated Nori products with minimal differentiation, that is, US and Europe receive the low grade and cheap Nori. The high-end, premium Nori products are mainly reserved for the consumption in Japan. In 1997, about 350,000 wet tons of Nori were produced in Japan with a retail value of one billion dollars. There are approximately seventy species of *Porphyra* and about thirty-three species occur in Japan. Nori cultivation is a well developed industry in Japan, where improvements have been made in techniques for controlled culturing of the conchocelis stage in shells and for artificial seeding of spores produced by the conchocelis onto cultivation nets which can be stored until placed in the open sea environment.

Genetic improvement of cultured species to maximize the yield of Nori and to develop cost-effective cultivation programs was restricted to classical breeding methods such as strain selection. Mitsua, O. et al., JP 11113529, Apr. 27, 1999.

Prior art describes methods for producing wall-less cells or protoplasts from Nori and protoplast fusion techniques used to produce new hybrid, polyploid and aneuploid genomes possessing combinations of genetic material found in the respective parental species. The new strains produced have altered chromosomal composition and are grown in the open sea. They show modifications in growth, pigment or metabolite composition. Cheney D. et. A., WO/99/29160, published Jun. 17, 1999. The main disadvantage of this approach is that new strains have to be developed, and even then there is a geographical constraint because, an open sea environment is required to cultivate the various seaweeds.

The technology of the present invention overcomes the above disadvantages and takes a unique approach to improving the quality and quantity of Nori and other seaweed products by providing specialized technology, systems and methods for cultivation of the various seaweeds, not in the natural ocean habitat, but inside land-based ponds that provide a stable, fully controlled habit having optimal cultivation conditions. These land-based seawater ponds may be installed in any part of the world, and preferably near a coastal region having an abundance of marine algae and suitable climatic and water temperatures, and at a site close to the processing and manufacturing plant location. The economic benefit of this cultivation technology is the reduced cost, as well as controlling the quality and yield of Nori and other seaweed products produced by changing the nutrient supply to the growing algae by altering the ingredient present in the seawater in the ponds rather than altering the genetic traits of the original species, although the technology can be applied to genetically altered or genetically engineered species as well.

Prior art describes a variety of pharmaceutical or medicinal compositions that were extracted from or derived by chemical process from marine algae, and showing useful effects.

For example, Yvin J. C. et al., describe compositions that have effects in modulating apoptosis dysfunction, WO/99/39718, Aug. 12, 1999.

Winget, R. R., describes compositions that have anti-inflammatory actions, WO/94/24984, Nov. 10, 1994.

Soma, G. et al., describe compositions that exhibit anti-herpes activity, EP 0462 020 A2, Dec. 18, 1991.

Boratyn, D. C., describes sunscreen compositions derived from naturally occurring plants and marine algae, U.S. Pat. No. 6,136,329, Oct. 24, 2000 and Huner N. et al., WO/0024369, May 4, 2000.

Kiriyama S described compositions derived from marine algae that are useful for treatment of hyperglyceridemia, U.S. Pat. No. 5,089,481, Feb. 18, 1992.

Prior art describes methods for producing wall-less cells or protoplasts from Nori and protoplast fusion techniques used to produce new hybrid, polyploid and aneuploid genomes possessing combinations of genetic material found in the respective parental species. The new strains produced have altered chromosomal composition and are grown in the open sea. They show modifications in growth, pigment or metabolite composition. Cheney D. et. A., WO/99/29160, published Jun. 17, 1999. The main disadvantage of this approach is that new strains have to be developed, and even then there is a geographical constraint because, an open sea environment is required to cultivate the various seaweeds.

The present invention overcomes the above disadvantages. It takes a unique approach to improving the quality and quantity of Nori and other seaweed products produced by providing specialized technology comprising of land-based seawater ponds that can be installed in any part of the world. The invention provides systems and methods for cultivation of the various seaweed species, not in the natural ocean habit, but inside land-based ponds that provide a stable, fully controlled habitat having optimal cultivation conditions. These land-based seawater ponds may be installed in any part of the world and preferably a coastal region having an abundance of marine algae species and suitable climatic and water temperatures. The ambient environmental conditions inside the land-based seawater ponds can be controlled so that the cultivation period may be all year round instead of relying on climatic conditions. The nutrient content of the seawater bonds can be formulated to design the composition and nutrient content of the seaweed cultivated in the land-based seawater ponds of the invention. The economic benefit of this cultivation technology is the reduced cost, as well as controlling the quality and yield of Nori and other seaweed products. The invention allows for growing seaweeds all year round by dividing the growth cycle into different stages of growth, by changing the environmental conditions for each stage to achieve maximum growth, and by changing the nutrient supply to the growing algae by altering the seawater in the ponds rather than altering the genetic traits of the original species. The technology is also applicable to genetically altered or genetically engineered species as well.

SUMMARY OF THE INVENTION

The present invention is directed to novel, unique and useful technology, systems and methods for carrying out large-scale mariculture, suitable for the production of a variety of seaweed genera and species, including, but not limited to, *Porphyra* (Nori), *Laminaria, Undaria, Eucheuma, Gracilaria, Ulva, Sargassum, Codium, Cladophora, Ascophyllum, Palmaria, Furcellaria, Fucus,* or *Enteromorpha*.

The technology for the invention features the use of land-based seawater ponds that provide a stable, fully controlled and environmentally safe cultivation system to enable the growth of *Porphyra* and/or other seaweeds, out of their natural open sea habitat.

The systems and methods comprise preplanned and preprogrammed environmental conditions including enriched seawater with essential and desired elements that may be incorporated into the growing seaweeds, to provide consistent quality, quantity and pollution free crop yields.

The object of the invention is to provide cost effective technology for the cultivation of edible seaweeds, for example, *Porphyra* (Nori), in land-based ponds by designing and constructing the ponds that are suitable for aquaculture of seaweeds; establishing cultivation procedures, e.g., seeding, growing and harvesting, and drying and preparing the product for the market. Such technology could not be applied successfully in open sea environments controlled by climactic conditions.

Another object of the invention is to develop methods for producing *Porphyra* and other seaweeds in land-based seawater ponds under controlled conditions to produce products that may be used as food components, neutraceuticals, cosmetics or pharmaceutics.

In preferred embodiments of the invention, the technology provides designer or tailor-made seaweeds having compositions that have unique properties, including, but not limited to, antiviral activity, antibacterial activity, antimycobacterial activity, antihelminthic activity, antiulcer properties, endocrine effects, anti-inflammatory effects, metal chelating properties, protection from radiation and as sunscreens, immunomodulatory properties, wound and burn healing properties, ant aging properties, antioxidant properties or anti-atherosclerotic properties.

BRIEF DESCRIPTION OF THE FIGURES

The advantages and features of the present invention will become readily apparent after reading the following detailed description and referencing the drawings. In order to facilitate a fuller understanding of the present invention, reference is made of the drawings which should not be construed as limiting the present invention, but are intended to be exemplary only and, which are:

In contrast, the present invention uses systems that use the asexual life cycle of *Porphyra* as the main fertilization pathway. This method may be used for using the asexual cycle for other seaweed species as well. The asexual life cycle (1) of *Porphyra* comprises the following—the aplanospore (5), the gametophyte (6) and the bipolar sporeling (7).

The sexual cycle (2) of *Porphyra* comprises the carposores (8), unipolar sporeling (9), sporophyte (10), the monospore (11), the conchocelis phase (12) and the plantlet (13).

FIG. 3 describes the production of spores and sporlings in the laboratory (21). This stage takes about one month. The sporlings are grown in sleeves, one sleeve for one small tank, in an environmentally controlled chamber (22). A chiller (23) may be used to control the temperature. The next stage of growth designated as Stage 1 (24) of *Porphyra* cultivation carried out in small tanks (401) and lasts for approximately 2 weeks.

The invention describes a design by which the temperature and other conditions were optimized to control each stage of cultivation of two *Porphyra* species. The growth stages can be programmed only in the land based sea ponds of the invention. Such stages can not be controlled in the open sea environment to optimize the cultivation of seaweeds, irrespective of the seasonal changes.

For example, during the months of June (25° C.), July (28° C.) and August (30° C.), the mother sporlings were grown in the laboratory.

During September (29° C.), October (26° C.), November (23° C.) December (20° C.) and January (19° C.), sporulation takes place and sporlings grow in environmentally controlled chambers in the laboratory.

During February (18° C.), March (18° C.), April (19° C.) and May (21° C.), the sporlings are frozen and maintained in the laboratory. During October to February, the 2 species of *Porphyra* entered different growth stages from growing in the sleeves, to stage 1, stage 2, stage 3, and stage 4. During March to April, the *Porphyra* species grew in stage 2, stage 3 and stage 4.

DETAILED DESCRIPTION OF THE INVENTION

Figure 1:
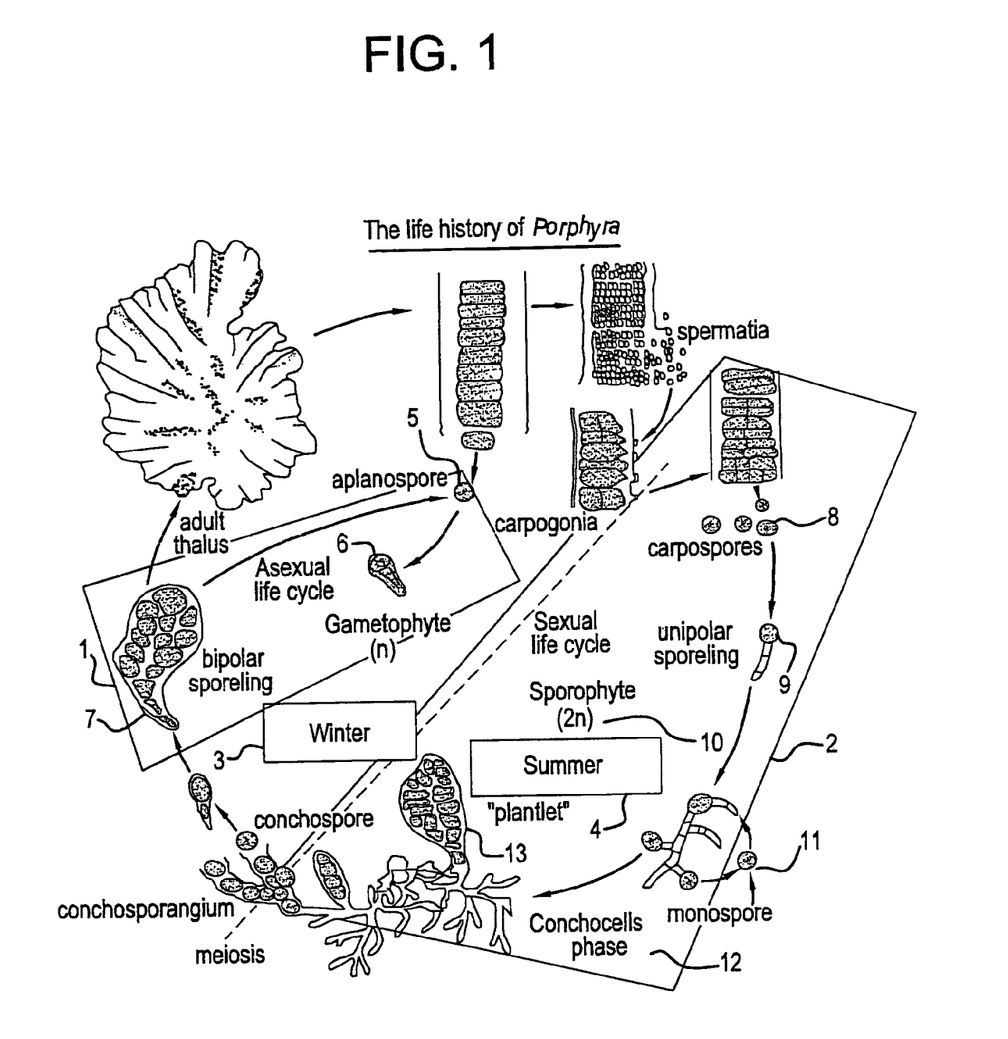
FIG. 1 outlines the life history of *Porphyra*, and shows that *Porphyra* may be grown by the asexual reproductive cycle (1) or sexual reproductive cycle (2). The asexual cycle takes place during the winter period (3) in the open sea and the sexual cycle occurs during the summer period (4). Prior art describes that heretofore, all *Porphyra* growers employed the sexual fertilization pathway when cultivating *Porphyra* in the open sea.

Referring to FIG. 1, the genus *Porphyra* has an asexual life cycle lasting during winter, comprising a macroscopic, haploid and gametophytic blade (1); and a sexual life cycle (2) that is microscopic, shell-boring, diploid and includes sporophytic filaments referred to as the conchocelis phase (12).

The gametophytic or blade phase represents the asexual life cycle (1) and what is normally found in nature and what is grown on nets in Nori cultivation in open seas. The haploid gametophytic phase consists of a membranous blade that may be one or two cells thick and either dioecious or monoecious, depending upon the species. In monoecious species various sized blocks of male and female cells develop along the blade at maturity. The gametophytic blade phase is seasonal and normally degenerates and dies after the production of carpospores. After sexual fertilization (2), diploid carpospores are produced by the blade, which give rise to the diploid sporophytic conchocelis phase (12). The sporophytic conchocelis phase typically grows as a mass of filaments embedded in shell and difficult to observe in nature. The filaments are composed of very long cells with a very narrow diameter, typically around 3 to 10 mirometers wide and several times that in length. Seasonal changes in the environmental conditions induce the conchocelis to produce packets or branches of larger-sized cells, typically 15 to 25 micrometer in diameter, called conchosporangial branches, which when mature, release diploid conchospores. Meiosis is thought to occur in the germinating conchospore. Typically, conchocelis cultures are grown on shells in large tanks and induced to produce and release conchospores prior to the farming season, through an alteration in light and temperature conditions. The conchospores released by the conchocelis are used to seed the nets that will be put out into the ocean to grow the blades, which are later harvested, dried and sold as Nori sheets. The sexual life cycle of fertilization during summer is used to cultivate *Porphyra* by almost all *Porphyra* farmers.

Figure 2:
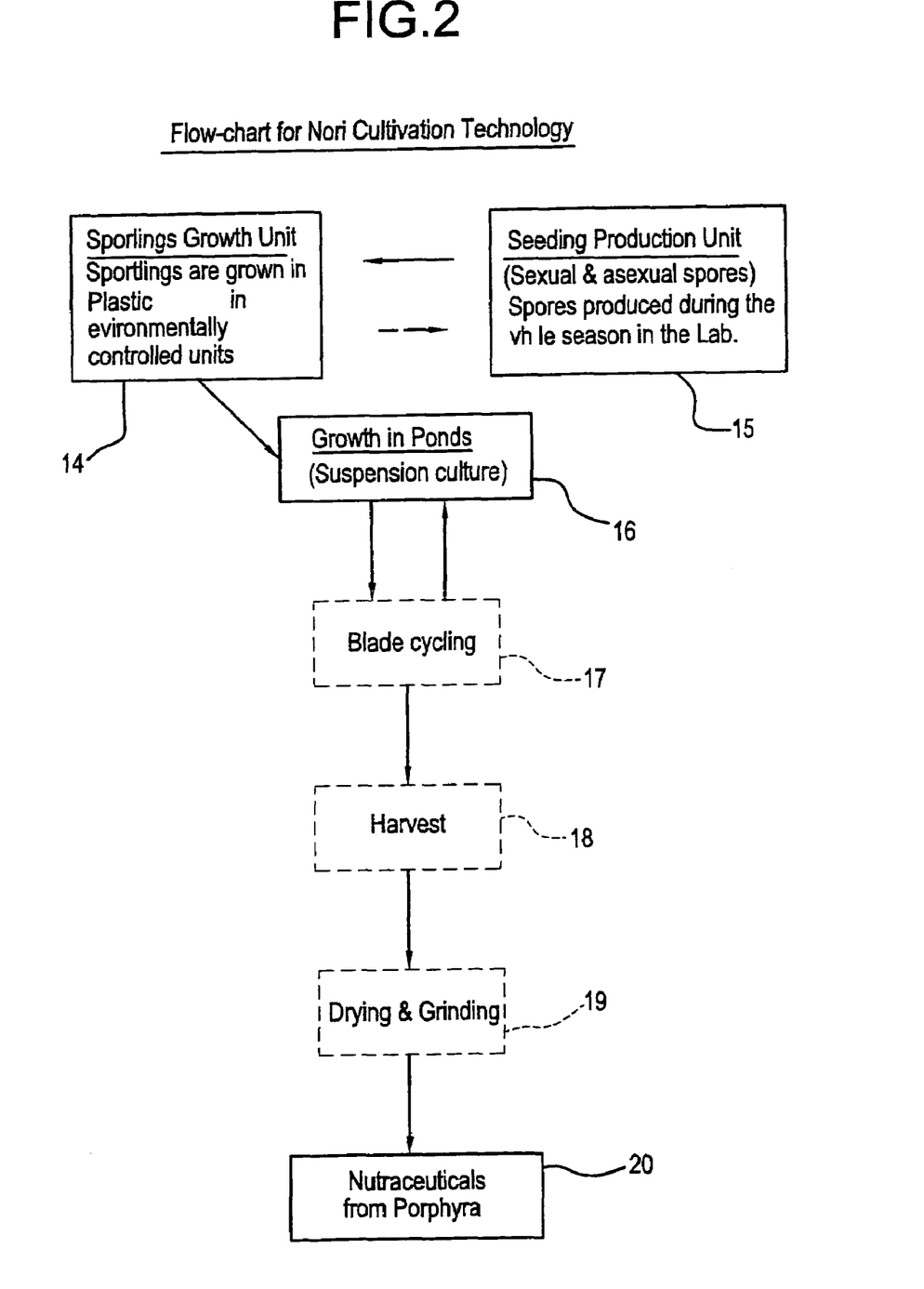
FIG. 2 describes the overall flow-chart for the steps in cultivation of Nori, including the sporting growth unit (14), the seeding unit (15) and various stages of cultivation, including growth in ponds (16) of algae in suspension culture, blade cycling (17), harvesting (18), drying and grinding (19) to produce *Porphyra* products, e.g., neutraceuticals, foods, cosmetics or pharmaceutics (20).

In contrast, the principal feature of the present invention for *Porphyra* mariculturing using land-based seawater ponds, is the asexual cycle of fertilization shown in FIG. 2. The advantage for using this mode of fertilization for *Porphyra* is that Nori can be cultivated during winter months. The main advantage of using the asexual cycle is the readiness and immediate availability of sporelings during the whole year. This can result in the extension of the cultivation period, provided that the outdoor conditions are adequate, and conditions in the land-based seawater ponds are adjusted. Another important advantage is that all the processes of cultivating separately the conchocelis stage are avoided. The land-based seawater ponds may also be used for summer cultivation of Nori and other commercially valuable seaweeds.

The technology of the present invention has been successfully applied to a network of land-based ponds, to achieve yields up to 2 Kg fw/m2/week during the growing season. *Porphyra* species and strains that prolong the cultivation season have been tested. Dried Nori (Hoshi-nori) grown by the invention is of good quality and enriched with nutritional elements such as proteins, fibers, minerals, vitamins, antioxidants, fatty acids and phytochemicals. Some advantages of the present invention of controlled cultivation technology include: i) successful growth of Nori that is free of pollutants (usually through controlling the incoming seawater, drainage or eutrophication of sea water), ii) free from environmental degradation and meteorological anomalies, iii) consistent production of high quality Nori and crop yield, iv) optimal conditions for maximum quality and crop yield, and v) easy access to harvesting and replanting.

Some examples of the specific applications of the present invention for the cultivation and improvement of *Porphyra* include, but are not limited to the following examples presented below.

1. The Nori cultivation is done in open sea and is dependent fully on sea ecology and climatic conditions. In contrast, the present invention provides technology to cultivate Nori and other seaweeds in land-based seawater ponds that are not under the influence of sea conditions such as extreme temperature changes, storms or nutrient content.

2. The Nori cultivation in open sea cannot control the yield or quality of product cultivated. In contrast, both the quality and yield of Nori cultivated in the invention is controlled, i.e., guaranteed high yields and high quality of tailor-made or designer Nori can be made on order.

3. The Nori cultivation in open sea has no control over the content or composition without modulating the strains or genetic traits. In contrast, the Nori grown in the present invention does not require genetic modulation to achieve improved products, because it allows for controlling the environmental conditions to be optimum.

4. The Nori grown in the open sea is susceptible to pollution hazards and contamination. In contrast, Nori produced in the invention is free of pollution and contamination.

5. The Nori grown in open sea is prone to contamination with epiphytes, other organisms and sand. In contrast, this problem does not exist for Nori grown in the invention.

6. Nori grown in open sea produces raw material that is generally suitable only for the production of Nori sheets. In contrast, the Nori grown in the present invention has raw material that is suitable for producing sheets, neutraceuticals cosmetics and pharmaceutics.

7. The open sea Nori cultivation is carried out on large scale area. In contrast, Nori cultivation in the invention is modular, flexible and adaptable for establishing maricultures of Nori in different parts of the world.

8. The open sea Nori cultivation is restricted to the local *Polrphyra* species found in the region. In contrast, Nori and any and all types of seaweeds can be cultivated using the technology of the invention.
9. The open sea Nori cultivation system has a growth season determined by the climate and seasonal changes. In contrast, Nori grown in the present invention allows the extension of the growth season by modulating the temperature.
10. The open sea Nori cultivation is inefficient, requires a large work force, and restricted to cultivation areas only. In contrast, Nori grown in the invention provides an efficient system, requires a very small work force in comparison, and requires a small cultivation area which can be located adjacent to a processing unit for convenience and cost savings.
11. The following examples are presented to illustrate the advantages of the present invention and to assist one of ordinary skill in the art in making and using the same. These examples are not intended in any way otherwise to limit the scope of the specification.
12. The conventional system requires and depends on the separate cultivation of the Conchocelis, usually grown away from the cultivation site and separate organizations. The present invention provides a system that does not require the Conchocelis cultivation and thus all the cultivation processes from spore to Nori raw material is located in the same place or site.

EXAMPLES

Example A

Indoor Phase

1. Production of Sporlings

Three months before the cultivation season begins, spores are produced in order to grow mother sporlings. See FIG. 2 and FIG. 3. The sporulation process can be achieved using methods described fully in the art and may include:

a) Asexual Sporulation from Sporlings that were Grown from the Previous Cultivation Season.

Sporlings discharge monospores when they are grown in petri dishes or in any unfavorable condition. Some disintegrate completely while releasing monospores in large quantities, on reaching 1-5 mm length—for example, *Porphyra Yezoensis* (YEZ). In YEZ all the cells of the sporlings are released as monospores. Other species release monospores on reaching 1-2 cm long like *Porphyra* sp. grown in Taiwan (TAW). This more than any other characteristic is a good sign for the degree of the sensitivity of the sporlings.

b) Sporulation from Thawing Sporlings that were Frozen at the End of the Previous Cultivation Season.

Sporlings and young thalii at the end of the previous cultivation season are washed with distilled water (quick wash—not more than 0.5 min) dried in sterile conditions for 4 min (in the laminar hood) and frozen to −50° C. Before the beginning of the cultivation season the frozen thalii are thawed to room temperature and rinsed in A medium than transferred to a 15° C. incubator under low light conditions (2 tissue paper layers). YEZ species start to discharge monospores within 2 weeks. Medium A contains enriched seawater containing antibiotics.

c) Sporulation from Conchocelis Grown During the Previous Summer.

Conchocelis, growing on Patella empty shells under 15° C. temperature will start to discharge conchospores to the growing substrates. The use of conchocelis for the production of spores is an important tool for low temp. *Porphyra* species like *Tenera*. This species is suitable for that kind of fertilization since the discharge of spores can be achieved after growth of conchocelis for only 4 months and the spore production is massive and simple to achieve.

2. Mother Sporlings Growth

The spores are produced under law light conditions (2 tissue layers) and germinate under high (one tissue layer) light conditions and photoperiod of 8L:16D, temp of 15° C. and medium P or A. After 1 week, the young sporlings are transferred to medium PO for preserving their vegetative characteristics that enable maturation without releasing monospores.

Medium PO is enriched seawater having reduced salinity. Medium P contains enriched seawater similar to the Provasoli's type.

3. Major Sporulation

After the sporlings have reached 2 cm long they are transferred to P medium for the massive spore production. The massive spore release is performed on petri dishes that rotate slowly (once a day) in order to disperse the spores evenly in the dishes, but at the same time, let the spores adhere to the substrate. The spore release is performed under the same conditions as for the mother sporlings production, as described above.

4. Initial Sporlings Growth

The sporlings are n in the laboratory (21, FIG. 3) in special incubators for 1 month until they have reached 1 mm length under high light conditions. When they have reached that length the sporlings are transferred into the plastic sleeves in the special controlled environment chambers (containers) (22, FIG. 3).

5. Major Sporlings Cultivation

Usually it takes 5-10 petri-dishes concentration for 1 sleeve. The young sporlings are transferred into plastic sleeves (0.2 to 0.4 m (Diameter, Dm)×1 to 3 m (L), and 10-30 L volume), for maturation of the sporlings into young thalli. The young sporlings are grown in the plastic sleeves for exactly 2 weeks with bi-weekly addition of nutrients (N,P) wherein N is $NH_4Cl$ 0.5 mM, and P is $NaH_2PO_4.H_2O$, 0.05 mM. The conditions in these containers are: Temp.−15° C., Light-cool light fluorescent and additional incandescent light. The seawater is filtered through 1μ mesh. The sleeves are aerated by continuous bubbling of air through plastic tubes. During this 2 weeks the sporlings will reach 0.5 cm.

Example B

Out Door Phase

1. Stage 1 growth—Referring to FIG. 3, Sporlings in the range of 0.5-1 cm long which were grown in the plastic sleeves are transferred to outdoor conditions to small (401) growth tanks, 1 sleeve for each tank. The tanks are generally U shaped, made fiber glass or plastic, with a volume capacity of 30 to 100 L, and dimensions in the range of 0.24 to 0.26 (Depth, Dp)×0.48 to 0.51 m (W)×0.68 to 1.0 m (L). They are grown in running seawater for at least twice a week until the sporlings reach 2-4 cm long. The seawater is enriched twice a week with N&P nutrients. There is possibility of cooling the seawater in the tanks with a chiller (23) in the beginning of the cultivation season. The cooling procedure can reduce ambient seawater by 3-5° C. and can add 1-2 weeks of cultivation time.

Figure 3:
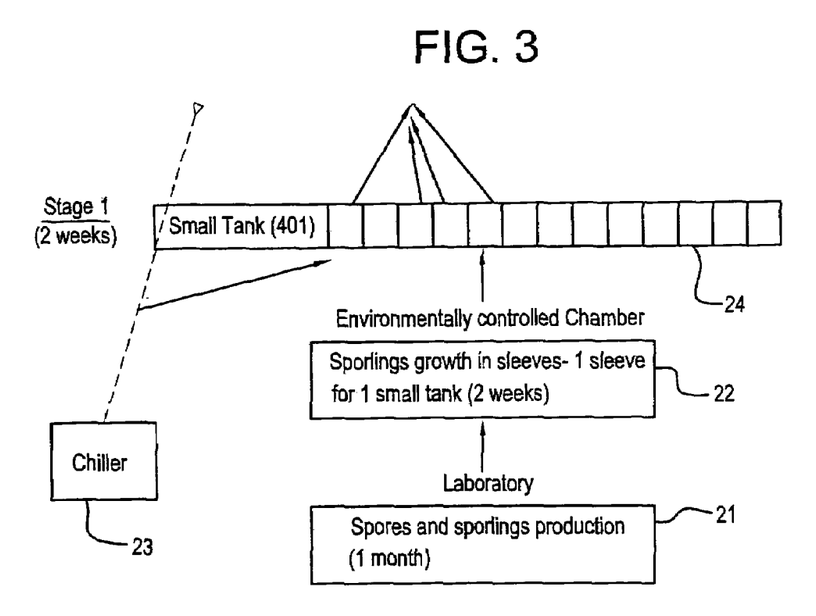

The tanks are shaded with 1 or 2 black plastic screens during the growth period particularly for the first week.

Figure 4:
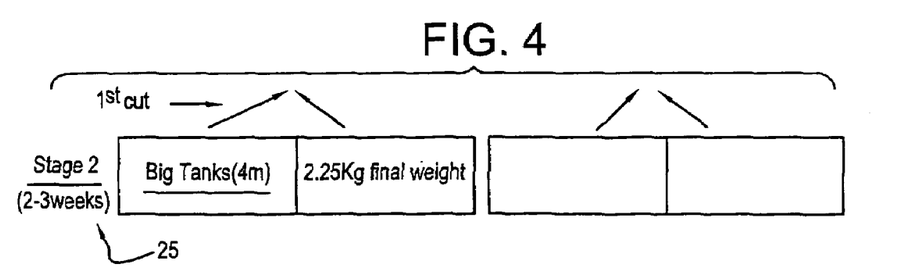
FIG. 4 describes Stage 2 (25) of *Porphyra* cultivation carried out in large tanks (4m) and lasts about 2 to 3 weeks to give a final weight of about 2.25 Kg. This Stage results in the first cut of the *Porphyra*.

2. Stage 2 growth—Referring to FIG. 4, after 2-3 weeks of growing mature sporlings in outdoor conditions in the small tanks, the young thalli are transferred to big cultivation tanks. These cultivation tanks are hung on a metallic skeleton support structure, are generally U-shaped, made of fiber glass or polyvinyl carbon, have a volume capacity of 2 to 5 m$^3$ and measure 0.7 to 0.9 m (Dp)×1.2 to 1.5 m (W)×2.5 to 10.0 m (L). The growth in these tanks is the optimal growth possible to cultivate the *Porphyra* until the harvest. Since the commercial cultivation demands cultivation in big ponds, the mature thalli are grown in these tanks for 3 weeks and then the thalli are cut (1$^{st}$ cut) to pieces by blender or similar device which can cut sharply the thalli (which can reach by now to 10 cm long) and make 1-2 cm long *Porphyra* pieces. The cutting device cuts the thalli in the water suspension and the process is carried out in cold water in-order to avoid any injury of the thalli due to bacterial contamination problems.

Figure 5:
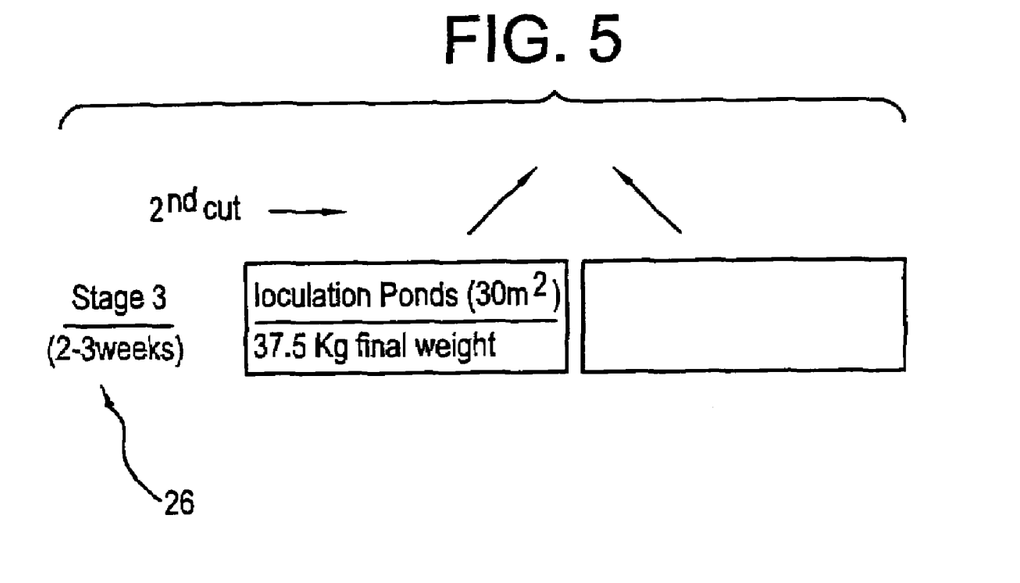
FIG. 5 describes Stage 3 (26) of *Porphyra* cultivation that is carried out in Inoculation Ponds (30 m$^2$) to produce about 37.5 Kg final weight. This stage results in the second cut.

3. Stage 3 growth—Referring to FIG. 5, after 3 weeks in which the *Porphyra* thalli are grown in the big U tanks and cut for the first time. The small *Porphyra* pieces are transferred into the inoculation ponds (small ponds which are 1/10 in area from the cultivation ponds and which are aerated ponds) and the small thalli are grown in the inoculation ponds in suspension for 2-3 weeks. These ponds are generally U-shaped, with a volume capacity of 10 to 30 m$^3$, and measure 0.7 to 0.9 m (Dp)×1.2 to 1.5 m (W)×25-50 m (L). The seawater is enriched with N&P or any other elements which are needed. The *Porphyra* thalli is cut again (2$^{nd}$ cut) at the end of the cultivation period in these ponds.

Figure 6:
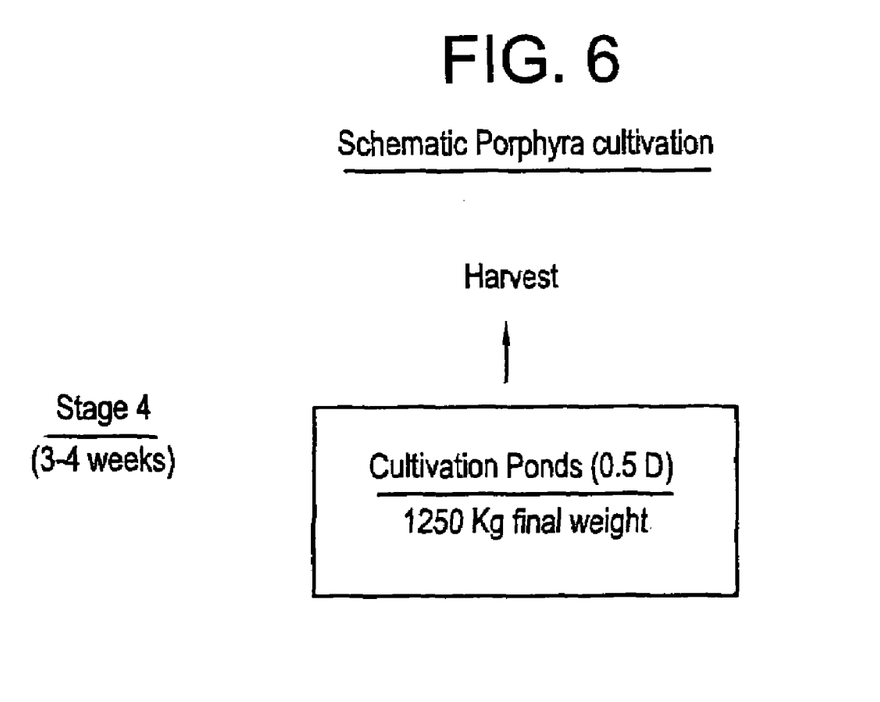
FIG. 6 describes Stage 4 (27) of *Porphyra* cultivation lasting 3 to 4 weeks in cultivation ponds (0.5D) to produce 1250 Kg final weight. This stage results in the harvest of *Porphyra*.

Stage 4 growth—Referring to FIG. 6, the small *Porphyra* thalli are transferred into the cultivation ponds, and grown in these big ponds for 2-3 weeks until it reaches 10 cm in length or density of 2.5-4 kg/m$^2$. These ponds are generally U-shaped, with a volume capacity of 34 to 50 m3, and measure 0.7 to 0.9 m (Dp)×1.2 to 1.5 m (W)×25-50 m (L). The *Porphyra* thalli are then all harvested by pumping the water through mesh. The water can be transferred back to the cultivation ponds and be used for the next batch of *Porphyra* thalli.

Example C

Figure 7:
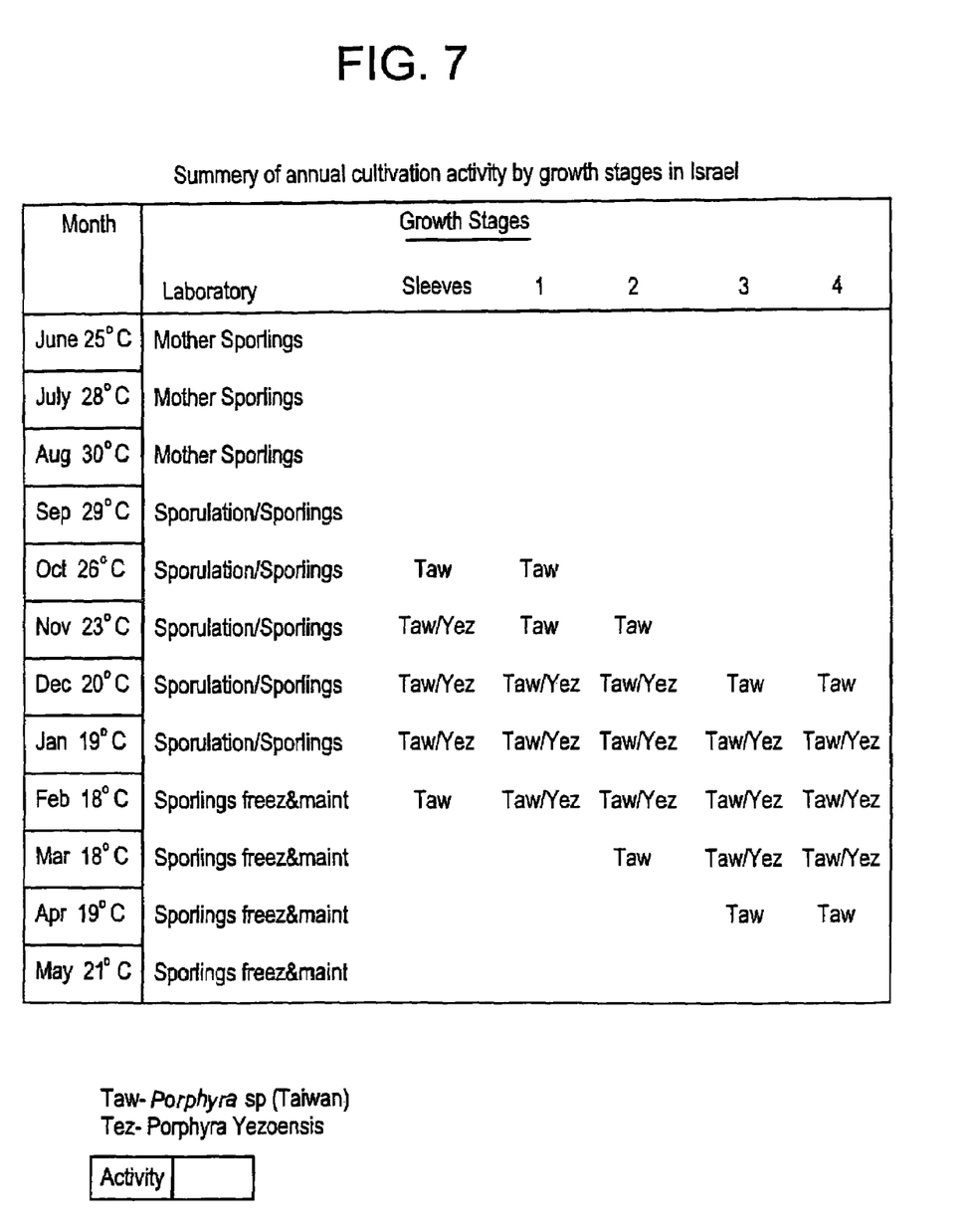
FIG. 7 describes the annual cultivation activity by growth stages in land-based seawater ponds for *Porphyra* species (P.sp) grown in Taiwan and *Porphyra Yezoensis*.

Annual Cultivation Activity by Growth Stages of Two Species of *Porphyra* by the Technology of the Present Invention FIG. 7 describes the results of growing two species of *Porphyra*, during a period starting in June to the following year in May. The temperature conditions were changed and the different stages of growth—growth of mother sporlings, sporulation/sporling, growth in sleeves, stage 1, stage 2, stage 3, and stage 4—were controlled using the technology of the invention. The results obtained demonstrate that the technology of the invention can be used to grow almost all year round (provided outdoor conditions are favorable) in any land-based sea pond system. Nori cultivation is therefore, no longer limited to open seas, and no longer restricted by open-sea climatic conditions.

The present invention is not to be limited in scope by the embodiment disclosed in the example which is intended as an illustration of one aspect of the invention and any methods which are functionally equivalent are within the scope of the invention. Indeed, various modifications of the invention in addition to those shown and described herein will become apparent to those skilled in the art from the foregoing description. Such modifications are intended to fall within the scope of the appended claims.

Those skilled in the art will recognize, or be able to ascertain using no more than routine experimentation, any equivalents to the specific embodiments of the invention described herein. Such equivalents are intended to be encompassed by the claims.

What is claimed is:

1. A system for land based units for cultivation of seaweeds, said units comprising:
    a) phycological laboratory facilities suitable to produce spores and sporelings in cultures;
    b) a plurality of sleeves having a volume capacity in the range of 10 to 30 liters, said sleeves aerated with air and containing seawater housed in temperature controlled land based facilities to allow the maturation of the sporelings;
    c) plurality of growth tanks with a volume of 30 to 100 L into which the sporelings are transferred for further growth into young thalli;
    d) a plurality of cultivation tanks having a volume capacity of 2 to 5 m$^3$ into which the thalli are transferred for further growth;
    e) a plurality of small inoculation tanks aerated with air, each tank having a volume capacity of about 10 to 30 m$^3$ and containing seawater enriched with 0.5 mM NH$_4$Cl and 0.05 mM NaH$_2$PO$_4$.H$_2$O, at least two times a week, for at least two weeks under optimal conditions, to allow the mature sporelings to grow into seaweed pieces;
    f) a plurality of large cultivation tanks aerated with air, each tank having a volume capacity of about 34 to 50 m$^3$, wherein the seaweed pieces are transferred, to grow to full size; and
    g) a harvesting unit to separate the seaweeds from the sea water.

2. The system according to claim 1 wherein units a) to g) are programmable to operate throughout a year.

3. The system according to claim 1 wherein unit a) is made of plastic and units b) and c) are made of fiber glass.

4. The system according to claim 1 further comprising a centrifugation drum drying unit or a low temperature oven drying unit.

5. The system according to claim 1 wherein unit a) is housed in a temperature controlled facility having a chiller to regulate the temperature.

6. A system for land based units for cultivation of seaweeds, said units comprising:
    a) phycological laboratory facilities suitable to produce spores and sporelings in cultures;
    b) a plurality of U-shaped sleeves measuring 0.2 to 0.4 m (Dm)×1 to 3 m (L), said sleeves aerated with air and containing seawater housed in temperature controlled land based facilities to allow the maturation of the sporelings;
    c) plurality of U-shaped growth tanks measuring 0.24 to 0.26 m (Dp)×0.48 to 0.51 m (W)×0.68 to 1.0 m (L) into which the sporelings are transferred for further growth into young thalli;
    d) a plurality of U-shaped cultivation tanks measuring 0.7 to 0.9 m (Dp)×1.2 to 1.5 m (W)×2.5 to 5 m (L) into which the thalli are transferred for further growth;
    e) a plurality of small inoculation tanks aerated with air, each tank measuring 0.7 to 0.9 m (Dp)×1.2 to 1.5 m (W)×5-10 m (L) and containing seawater enriched with 0.5 mM NH$_4$Cl and 0.05 mM Na$_2$PO$_4$, at least two times a week, for at least two weeks under optimal conditions, to allow the mature sporelings to grow into seaweed pieces;

f) a plurality of large cultivation tanks aerated with air, each tank measuring 0.7 to 0.9 m (Dp)×1.2 to 1.5 m (W)×25 to 50 m (L), wherein the seaweed pieces are transferred, to grow to full size; and g) a harvesting unit to separate the seaweeds from the sea water.

7. The system according to claim 6 wherein units a) to g) are programmable to operate throughout a year.

8. The system according to claim 6 wherein unit a) is made of plastic and units b) and c) are made of fiber glass.

9. The system according to claim 6 further comprising a centrifugation drum drying unit or a low temperature oven drying unit.

10. The system according to claim 6 wherein unit a) is housed in a temperature controlled facility having a chiller to regulate the temperature.

* * * * *